April 17, 1951 A. C. SKOOGLUND 2,549,535
GLASS MOLDING LUBRICANT
Filed Feb. 11, 1949

Arthur C. Skooglund Inventor
By Edwin M. Thomas Attorney

Patented Apr. 17, 1951

2,549,535

UNITED STATES PATENT OFFICE 2,549,535

GLASS MOLDING LUBRICANT

Arthur C. Skooglund, Woodmont, Conn., assignor to Standard Oil Development Company, a corporation of Delaware Application February 11, 1949, Serial No. 75,957

3 Claims. (Cl. 18—47)

1

The present invention relates to a new lubricant for molding glass, and the like. More particularly, it relates to a lubricant or separating medium which comprises an oily vehicle of unusual surface active properties, preferably containing suspended therein a substance such as a graphite, or the like, which has the property of facilitating the formation of molded glass product in the mold. As a particular feature, the product contains a surface active or wetting agent which, according to the present invention, increases very materially the effectiveness and efficiency of the lubricant, with or without a suspended separating agent, by reason of its surface active properties.

Figures 1, 2:
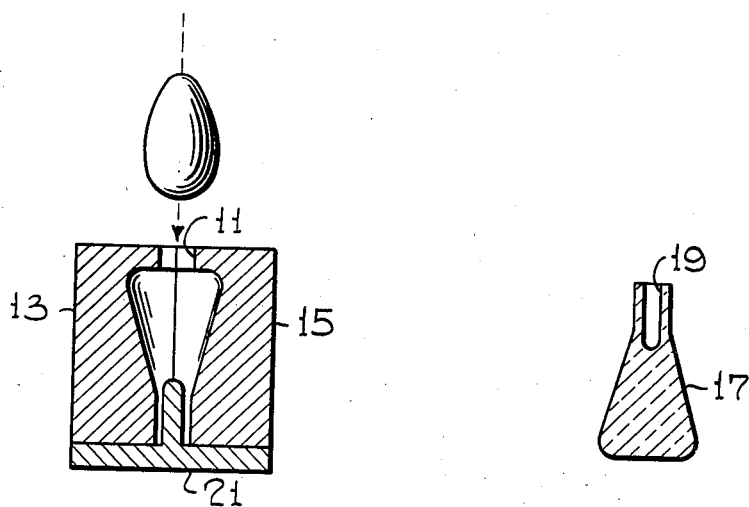
Figure 3:
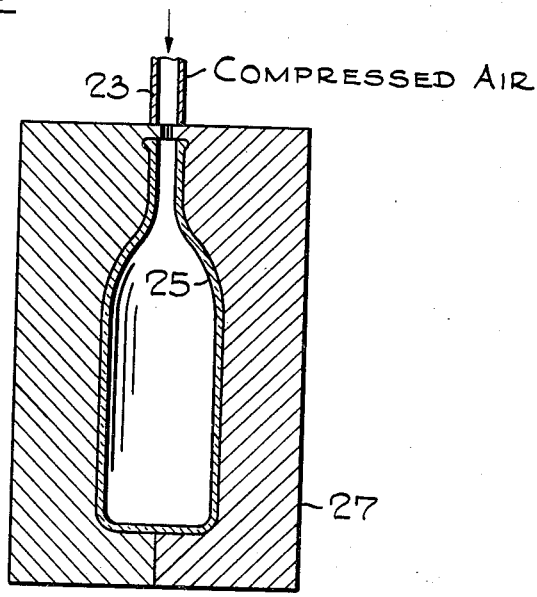

For the molding of glass bottles, jars, household and other glass ware, and analogous articles which necessarily must be done at very high temperatures, various machines and processes have been developed to a state of relatively high efficiency. While the details of such machines and processes may vary considerably, the following operations are typical. Figs. 1, 2 and 3 of the drawings show respectively a first molding step, the molded embryo blank, and the final molding in a blow mold.

A batch of molten glass is prepared in a pot or furnace and is extruded in measured unit quantities to form a body or "gob" of predetermined mass. The extruded glass, in its viscous molten condition is severed from the furnace batch by a shear device and is dropped into a primary mold, known commonly as the blank mold 10. See Fig. 1. This blank mold has an opening 11 at the top through which the severed "gob" of glass passes into the mold proper which comprises two or more relatively and laterally movable molding segments 13 and 15. These molding segments are positioned toward each other in closed position to form the gob of glass into an embryo bottle, jar or the like, the formed blank embryo product being known as a "parison" 17. The "parison" 17 has a small hollow 19 formed therein by a plunger 21 to which an inflating device 23 may be connected to inflate or distend the "parison" 17, in the next molding stage, to form a piece of hollow glass ware 25 in the final mold 27 which is substantially larger than the first or blank mold. See Fig. 3.

After the "parison" is formed, the blank mold 10 is opened by moving its segments 13 and 15 away from each other and the blank is transferred to the second or final mold for blowing or distending into its finished shape. While some lubrication may be required in the second molding stage, the principal lubrication problem occurs in the primary or blank molding stage where the "parison" is formed. Hence this invention is particularly concerned with a lubricant or separating composition for the blank mold and with the process of forming the "parison," although it has some application also to the final molding operation and its lubrication.

As the severed "gob" of glass drops into the blank or "parison" mold, it should conform itself to the sides of the mold without flaws or wrinkles in its surface. It has been customary in the prior art to spray the blank mold before each operation with a lubricant which comprises a mineral base oil carrying a dilute suspension of graphite or the like as a separating agent. Due to the high temperature of the molten glass (about 900° to 1050° F.) the oil is immediately vaporized but in an ideal operation the suspended graphite conventionally used remains to provide some lubrication so that the glass will flow into the mold without sticking to its sides and forming wrinkles or other surface flaws which carry over into the final product.

Since the blank mold usually has a temperature somewhat below that of the glass, the glass is chilled upon contacting its surface. If the mold is not properly lubricated, the glass sticks to the walls and does not move along the mold walls properly so as to fill the mold completely and eliminate the surface flaws which result from incomplete forming of the "parison." Such flaws are especially common around the necks of bottles, etc. where flow of glass is easily impeded. Apparently the vaporized oil usually forms a vapor blanket which largely separates or "lubricates" but in the prior art the mold could not be adequately lubricated even by the regular spraying of lubricant. Periodically, the molds had to be hand swabbed with a cleansing lubricant, in addition to the regular spraying operation.

The prior art swabbing compounds have commonly comprised mineral oil, graphite, and often an additional oily or greasy material such as vegetable or animal fat, for example degras or wool grease. By periodically swabbing the molds with such a material, in addition to the regular spraying with oil, thus adding additional lubricant and removing carbon deposits, fairly good results have been achieved but continuous production over extended periods has not been realized and the product quality has not been entirely uniform or satisfactory. The primary object of the present invention is to overcome these deficiencies.

Obviously, if satisfactory continuous production can be achieved, the output of a given machine can be increased with resultant decrease in unit cost. If satisfactory lubrication can be obtained by the regular spraying alone, eliminating the swabbing step or at least making the requirement for swabbing much more infrequent, a considerable increase in production efficiency can be secured and such is a further object of the invention.

In the prior art there has been a pronounced tendency for carbonaceous residues to build up gradually around the throat (upper opening) and to some extent in the constricted lower portions of the blank molds so as to interfere with the flow of glass into the mold. This is due to the restricted cross section of the openings, to the ridges, grooves, and other surface features which may characterize the glass product at certain points and to the greater quantity of oil which is necessarily sprayed around the surfaces of the opening, as well as the character of the lubricant as regards its tendency to leave a residue upon evaporation. According to the present invention, this tendency to constrict the opening and retard the proper filling of the mold may be largely overcome by adding to the lubricant a suitable wetting or surface active agent. Such an agent is one which facilitates the spread of the oil over the mold surface and into all its surface irregularities.

It has also been found, in prior art glass molding practice, that after the molds have been in use for some time their metal surfaces show considerable deterioration. Apparently iron and silica, which are common ingredients of such molds, are absorbed, adsorbed or otherwise extracted to some degree by the molten glass so that the mold surface becomes roughed, pitted and otherwise non-uniform. This of course interferes with the movement of glass over the mold surface and tends to increase the percentage of unsatisfactory produces. The lubricant of the present invention appears to be advantageous in that it covers the mold surface more perfectly, coating the minute cavities and abrasions more fully so that the glass flows more evenly. Surface deterioration of the mold is retarded at least to some extent and the mold life is increased while the quality of the product is improved.

Aside from the fact that considerable labor is required to swab the glass molds and blanks, the conventional prior art swabbing is undesirable for other reasons. The molds are not swabbed at every operation, since regular spraying is adequate with occasional swabbing and, therefore, variations in the quality of the glassware result. Immediately after swabbing, the first few molded glass products contain strains and other imperfections that are undesirable. As the swabbed lubricant in the mold is gradually consumed, the tendency to wrinkle becomes predominant and bottles and like ware come through with a wrinkled or washboard effect, particularly on the necks of bottles, and this is at least equally undesirable.

The lubricants of this invention involve a lubricating oil of end point well below the molding temperatures modified with an effective wetting agent. The wetting agents preferred are organic compounds having preferably one or two long aliphatic chains, e. g., chains of 12 to 24 carbon atoms, and at least one, and preferably more than one, very short chain or equivalent. Thus, the long chain ($C_{12}$ to $C_{24}$) esters of short chain monohydric or polyhydric alcohols are preferred, the monoesters being preferred. Simple $C_{12}$ to $C_{24}$ esters of $C_2$ to $C_4$ monobasic acids are especially preferred.

As a suitable example of an effective glass mold lubricant, the following composition was prepared:

*Example*

95% by weight of naphthenic base lubricating oil, 40 S. S. U. viscosity at 210° F.

3% "Grafe" (10% suspension of colloidal graphite in oil)

2% isopropyl oleate

By the use of the composition of the example, it appears that the pores and imperfections in the metal surface of the mold are effectively covered because a wetting agent is used, so that they do not act as a drag against the molten glass when it is charged to the mold and spread over its surface.

Although the above formula appears to be about optimum, it may be varied considerably. In general, the lubricating composition should consist of 90 to about 99.5% by weight of oil which has a substantial end point below the molding temperature of the glass. In other words, the oil should be substantially fugitive at the molding temperature. It may be a mineral base oil, a hydrocarbon oil derived from other sources, or a synthetic oil such as the various esters and/or polyglcols and the like which are used as substitutes for mineral base lubricating oils. The mineral oils of about ordinary lubricating grade are preferred for reasons of economy.

To a suitable oil should be added 0.10% to about 5% of colloidal graphite, preferably 0.1 to 1%. As the surface active or wetting agent, it is preferred to use about 0.4 to 5% of an agent which will evaporate without leaving an ash or other substantial residue. A preferred type of wetting agent is a monoester of a fatty acid, said ester having not more than 10 carbon atoms in the esterifying group and 12 to 24 carbon atoms in the acid radical. If desired, however, the esterifying group may be a long chain and the acid radical a short one. One chain should be long and one or more should be quite short. Examples of such esters are benzyl laurate, amyl stearate, ethyl cerotate, esters of fatty acids produced by the oxidation of wax, esters of alcohols produced by the Oxo reaction between olefins, carbon monoxide and hydrogen, esters of acids produced by the reaction between olefins, carbon monoxide and water, esters of ether alcohols such as the commercial carbitols and cellosolves, etc. When the fatty acids are esterified with glycols or with polyhydroxy alcohols, the esters may contain free hydroxy groups. Examples are pentaerythritol-mono-oleate and sorbitan-mono-oleate. Atoms of elements that contribute to the property of oiliness in oil-soluble compounds may also be present, as in chloro-methyl-stearate or methyl-dichlorostearate. Other types of esters having oiliness and surface active properties, for example, tricresyl-phosphate, may be used where considerations of cost or of toxicity permit. In general, the surface active agent must facilitate the spreading of the oil and should not have a substantial residue either of gum, ash, or carbon.

For the latter reason, the metal sulfonates, which are good wetting agents but leave residual ash on consumption or evaporation are less desirable, although they may be used in some cases.

In the glass molding industry, it is usual to apply a substantial quantity of oil not only for lubrication but also for cooling purposes. Hence oil consumption is relatively high. According to the present invention, cooling of the mold by such means is less essential and oil consumption can be very greatly reduced in many cases. Also, as previously suggested, by spraying the mold after each operation with a composition containing the fugitive oil, graphite, and evaporable or largely evaporable wetting agent, the product is uniform in quality and free from wrinkles, pits, cavities, and other surface flaws.

In one typical operation on a standard glass molding machine producing flint glass bottles of ⅘ quart capacity at a rate of 58 bottles per minute, the blank molds were sprayed at each operation with a prior lubricant containing graphite but not a wetting agent. The molds were swabbed at intervals of not more than 8 minutes also according to prior art practice. Difficulty was frequently encountered in properly forming the "parisons" or blanks and difficulty was encountered also in loading the blank molds. As suggested above, the principal difficulty is usually encountered in the blank mold where there is considerable flow of glass over the mold surface. Less trouble is encountered in the blow mold where relative flow is very limited.

When the lubricant of the present invention, made according to the example above, was substituted and sprayed each time without intermittent swabbing it was found that it was easier to load the glass blanks. As a result, the net output was increased 5 to 10% due to the easier loading, and the quality of the glassware was substantially improved. The bottles had a more polished surface with fewer imperfections and, in general, the overall operations of the glass molding machine were noticeably improved. The oil consumption, also, was measurably decreased. On one typical operation at 58 to 60 bottles per minute, the oil consumption was not over 20 gallons per day or about 0.9 cc. per bottle. This can be further reduced if desired.

Other machines molding other glass products have showed a similar and comparable improvement with the lubricant composition and the process of this invention, and it appears that the process of uniformly spraying the molds with a product as described above gives a very substantial and unexpected improvement over prior art process. In another example, molding small jars of a type commonly used for baby foods, at the rate of 122 per minute, spraying about 3 drops of oil per glass, the lubricant product described above operated successfully for 216 hours while other competitive products failed in as little as 12 hours, due to carbon deposits which prevented loading.

In order that the graphite may remain in suspension in the lubricant, a colloidal graphite should be used. It is an effective lubricant and in proportions of 0.1 to 5% by weight, based on the total composition, it is usually a desired ingredient. However, where the molds are in good condition a lubricant consisting merely of a mineral oil which leaves no gummy or carbonaceous residue upon evaporation, with about 0.4 to 5% by weight of a good wetting agent which likewise forms no residue on evaporation, may be used. In this case the vapor blanket effect alone seems to provide adequate lubrication and by carrying the lubricant to every part of the mold, covering all its surface irregularities completely with a film of oil, the flow of glass seems to proceed with resultant production of flawless glass products.

The wetting agent should have such potency that it carries the oil to coat every minute element of the mold surface with a minimum of oil consumption. By using a minimum of oil a minimum of carbonaceous or gummy residue is formed which is a most desirable condition if the separating or lubricating power of the composition is adequate. The esters which have a long chain ($C_{12}$ to $C_{24}$) aliphatic radical and at least one short radical of less than about 6 carbon atoms (e. g., $C_2$ to $C_4$) may be prepared by esterifying short chain alcohols with long chain acids or vice versa. For reasons of economy the former are preferred. As indicated above, colloidal graphite, which will remain in stable suspension over long periods of time, is also a preferred ingredient but is not always essential and may be omitted with advantages for some types of molding operations.

What is claimed is:

1. A lubricating composition for molding glass, and the like, at high temperatures consisting essentially of 90 to 99.5% by weight of hydrocarbon oil having an end boiling point below the molding temperature, 0.1 to 5% of finely divided graphite and 0.4 to 5% of an alkyl ester of a fatty acid, said ester having not more than 6 carbon atoms in one group and 12 to 24 carbon atoms in the other.

2. Composition as in claim 1 wherein said ester is isopropyl oleate.

3. Composition according to claim 1 wherein the graphite is 0.1 to 1% of colloidal graphite.

ARTHUR C. SKOOGLUND.

REFERENCES CITED

The following references are of record in the file of this patent:

UNITED STATES PATENTS

| Number | Name | Date |
|---|---|---|
| 1,792,052 | Wagner | Feb. 10, 1931 |
| 1,879,874 | Kidder | Sept. 27, 1932 |
| 2,041,076 | Lincoln et al. | May 19, 1936 |
| 2,246,463 | Garratt | June 17, 1941 |
| 2,256,603 | Wright | Sept. 23, 1941 |
| 2,410,422 | Breene et al. | Nov. 5, 1946 |